US010372131B2

(12) United States Patent
Alvarez Rodriguez et al.

(10) Patent No.: US 10,372,131 B2
(45) Date of Patent: Aug. 6, 2019

(54) VEHICLES CHANGING LANES BASED ON TRAILING VEHICLES

(71) Applicant: Ford Global Technologies, LLC, Dearborn, MI (US)

(72) Inventors: Emma Itxel Alvarez Rodriguez, Mexico City (MX); Antonio Espiritu Santo Rincon, Atizapan de Zaragoza (MX)

(73) Assignee: Ford Global Technologies, LLC, Dearborn, MI (US)

( * ) Notice: Subject to any disclaimer, the term of this patent is extended or adjusted under 35 U.S.C. 154(b) by 84 days.

(21) Appl. No.: 15/643,391

(22) Filed: Jul. 6, 2017

(65) Prior Publication Data

US 2019/0011916 A1    Jan. 10, 2019

(51) Int. Cl.
| G01C 22/00 | (2006.01) |
| G05D 1/00 | (2006.01) |
| B62D 15/02 | (2006.01) |
| B60R 1/00 | (2006.01) |
| B60K 35/00 | (2006.01) |
| B60Q 9/00 | (2006.01) |
| B60Q 5/00 | (2006.01) |
| B60Q 1/00 | (2006.01) |
| G08B 21/00 | (2006.01) |

(52) U.S. Cl.
CPC .......... G05D 1/0088 (2013.01); B60K 35/00 (2013.01); B60Q 5/005 (2013.01); B60Q 9/00 (2013.01); B60R 1/00 (2013.01); B62D 15/0255 (2013.01); G05D 1/0094 (2013.01); B60K 2350/2013 (2013.01); B60R 2300/30 (2013.01); B60R 2300/8066 (2013.01); G05D 2201/0213 (2013.01)

(58) Field of Classification Search
CPC .... G05D 1/0088; G05D 1/0094; B60K 35/00; B60Q 5/005; B60Q 9/00; B60Q 1/00; B60R 1/00; B62D 15/0255
USPC ...................... 701/28; 340/436, 540; 348/148
See application file for complete search history.

(56) References Cited

U.S. PATENT DOCUMENTS

| 8,044,776 B2 | 10/2011 | Schofield | |
| 9,305,223 B1* | 4/2016 | Ogale ................ G06K 9/00825 |
| 2004/0036601 A1* | 2/2004 | Obradovich ........ B60C 23/0408 |
| | | | 340/540 |

(Continued)

FOREIGN PATENT DOCUMENTS

| JP | 2007233507 A | * | 9/2007 |
| JP | 2012177997 A | | 9/2012 |

OTHER PUBLICATIONS

English Translation for JP2007233507A.*

*Primary Examiner* — Mahmoud S Ismail
(74) *Attorney, Agent, or Firm* — Neal, Gerber & Eisenberg LLP; Frank Lollo; James P. Muraff

(57) ABSTRACT

Methods and apparatus are disclosed for vehicles changing lanes based on trailing vehicles. An example vehicle includes a vehicle speed sensor to measure a vehicle speed, a rearview camera to capture images when the vehicle speed is greater than a threshold, and a lane controller. The lane controller is to detect whether there is a trailing vehicle based on the images and determine, responsive to detecting the trailing vehicle, whether the trailing vehicle is providing a message to change lanes. The lane controller also is to send a lane-changing signal responsive to identifying the message.

18 Claims, 7 Drawing Sheets

(56) References Cited

U.S. PATENT DOCUMENTS

| | | | |
|---|---|---|---|
| 2010/0194888 A1* | 8/2010 | McElroy | B60Q 1/143 |
| | | | 348/148 |
| 2010/0253543 A1 | 10/2010 | Szczerba | |
| 2011/0057782 A1* | 3/2011 | Chundrlik, Jr. | B60R 1/00 |
| | | | 340/436 |
| 2016/0375827 A1 | 12/2016 | Bonhoure et al. | |
| 2018/0201270 A1* | 7/2018 | Kang | B60W 30/18163 |

* cited by examiner

VEHICLES CHANGING LANES BASED ON TRAILING VEHICLES

TECHNICAL FIELD

The present disclosure generally relates to vehicles changing lanes and, more specifically, to vehicles changing lanes based on trailing vehicles.

BACKGROUND

Oftentimes, road vehicles (e.g., cars, trucks, buses, motorcycles) travel on highways to get from one destination to another. Typically, highways are constructed to be capable of carrying reasonably heavy traffic. In some instances, to increase the capacity of a highway, the highway is a multilane road that includes multiple lanes for each direction of travel. For instance, a highway may include four lanes (i.e., a 4-lane highway) in which two of the lanes are designated for a first direction of travel and the other two lanes are designated for an opposing second direction of travel. In some instances in which a highway includes multiple lanes for a same direction of travel, regions (e.g., countries, states, etc.) designate one of those lanes as a passing lane in which faster vehicles are to pass slower vehicles travelling in the other of those lanes.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for vehicles changing lanes based on trailing vehicles. An example disclosed vehicle includes a vehicle speed sensor to measure a vehicle speed, a rearview camera to capture images when the vehicle speed is greater than a threshold, and a lane controller. The lane controller is to detect whether there is a trailing vehicle based on the images and determine, responsive to detecting the trailing vehicle, whether the trailing vehicle is providing a message to change lanes. The lane controller also is to send a lane-changing signal responsive to identifying the message.

An example disclosed method for changing lanes based on trailing vehicles includes capturing images via a rearview camera of a vehicle and detecting, via a processor, whether there is a trailing vehicle based on the images. The example disclosed method also includes determining, responsive to detecting the trailing vehicle, whether the trailing vehicle is providing a message to change lanes and sending a lane-changing signal responsive to identifying the message.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
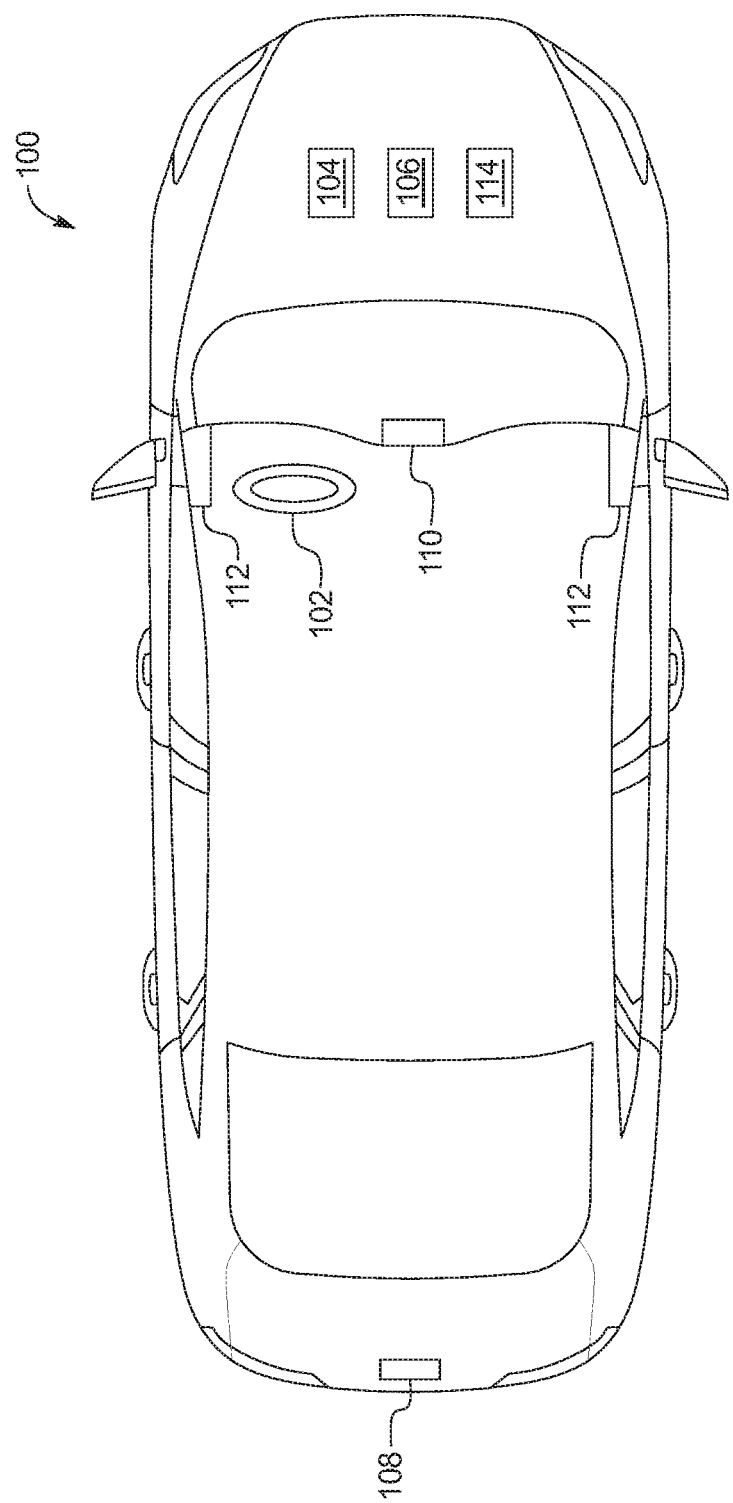
FIG. 1 illustrates an example vehicle in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Oftentimes, road vehicles (e.g., cars, trucks, buses, motorcycles) travel on highways to get from one destination to another. Typically, highways are constructed to be capable of carrying reasonably heavy traffic. In some instances, to increase the capacity of a highway, the highway is a multilane road that includes multiple lanes for each direction of travel. For instance, a highway may include four lanes (i.e., a 4-lane highway) in which two of the lanes are designated for a first direction of travel and the other two lanes are designated for an opposing second direction of travel. In some instances in which a highway includes multiple lanes for a same direction of travel, regions (e.g., countries, states, etc.) designate one of those lanes as a passing lane in which faster vehicles are to pass slower vehicles travelling in the other of those lanes.

As used herein, a "passing lane," a "fast lane," and an "overtaking lane" refers to a lane of a multilane road that is designated for vehicles to pass or overtake slower vehicles that are traveling in an adjacent lane (e.g., a non-passing lane) of the multilane road. Typically, a passing lane is closer than a non-passing lane is to a center line of a road. That is, the passing lane is typically between a non-passing lane and a center line of a road. For example, in North America, passing lanes are typically to the left of non-passing lanes in the direction of travel. As used herein, an "adjacent lane" refers to a lane of a road that is adjacent to a passing lane of the road in which slower and/or non-passing traffic is designated to travel.

In some instances, a faster vehicle may approach a slower vehicle that remains in a passing lane of a road. In such instances, the faster vehicle may pass the slower vehicle by changing lanes into an adjacent lane. In other instances, the faster vehicle may attempt to send a message for the slower vehicle to change lanes into the adjacent lane so that the faster vehicle is able to pass the slower vehicle via the passing lane. For example, the faster vehicle may attempt to convey its message by closely trailing the slower vehicle, flashing its high beams at the slower vehicle and/or activating its turn signal in a direction that is opposite to the adjacent lane). In some such instances, the message is not received by the slower vehicle if, for example, the driver of the trailing vehicle does not see the message being conveyed behind him or her and/or does not understand the meaning of the message being conveyed by the faster vehicle.

Example methods and apparatus disclosed herein include a lane controller of a vehicle that detects when a trailing vehicle is conveying a message (e.g., by trailing the vehicle within a predetermined distance, by flashing its high beams, by activating a turn signal in a direction opposite to an adjacent lane) for the vehicle to change lanes from a passing lane and sends a lane-changing signal to change lanes into an adjacent lane upon detecting the message of the trailing vehicle.

Examples disclosed herein include a lane controller for warning a vehicle of another approaching vehicle and/or for initiating the vehicle to change lanes autonomy based on the approaching vehicle. The vehicle includes a rearview camera that is activated when the vehicle is traveling at a speed above a predetermined threshold. The rearview camera is activated to capture images of an area behind the vehicle to detect the approaching vehicle. The system performs a detection algorithm to determine whether the approaching vehicle is conveying a message to the vehicle to change lanes. The message may include turning on its turn signal, turning on its headlamps, or trailing the vehicle at a distance less than a predetermined threshold. To detect whether the approaching vehicle is conveying a message based on the captured images, the lane controller converts the captured images to grayscale, sets image data to a threshold saturation, counts a number of white pixels, determines a light intensity, and repeats the computations for each frame. If the lane controller detects a message from the trailing vehicle to change lanes, the system presents a warning (e.g., visual, audio, haptic) to the driver and/or instructs the vehicle to autonomously change lanes. For example, the message is conveyed by the trailing vehicle by trailing the vehicle within a predetermined distance, flashing its high beams, and/or activating a turn signal for a direction that is opposite to an adjacent lane of the road.

As used herein, a "headlamp" refers to a lamp located at a front of a vehicle to light an upcoming portion of a road. As used herein, a "headlight" refers to a beam of a light that is emitted by a headlamp of a vehicle. As used herein, "low beams" refer to beams of light emitted by headlamps of a vehicle that are utilized to illuminate a greater side of a road along which the vehicle is traveling, for example, to avoid producing glare for oncoming traffic. As used herein, "high beams" refer to bright beams of light emitted by headlamps of a vehicle that are utilized when the vehicle is isolated on a road to illuminate a greater portion of the road. For example, high beams may illuminate a side of a road along which a vehicle is traveling as well as a side of a road dedicated for on-coming traffic. As used herein, "flashing" headlights and/or high beams refer to a sequence in which high beams of headlights are activated and deactivated repeatedly such that the high beams repeatedly turn on and off intermittently.

Turning to the figures, FIG. 1 illustrates an example vehicle 100 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). In the illustrated example, the vehicle 100 includes a steering wheel 102, an autonomy unit 104, a vehicle speed sensor 106, and a rearview camera 108.

The steering wheel 102 of the illustrated example is controlled by a driver of the vehicle 100 to perform non-autonomous steering motive functions of the vehicle 100. Further, the autonomy unit 104 controls performance of autonomous and/or semi-autonomous driving maneuvers of the vehicle 100. For example, the autonomy unit 104 performs the autonomous and/or semi-autonomous driving maneuvers based upon, at least in part, measurements collected via sensor(s) (e.g., the vehicle speed sensor 106, a radar sensor 618 of FIG. 6, a lidar sensor 620 of FIG. 6, an ultrasonic sensor 622 of FIG. 6, etc.) and/or image(s) and/or video collected via camera(s) (e.g., the rearview camera 108) of the vehicle 100.

In the illustrated example, the vehicle speed sensor 106 measures a vehicle speed of the vehicle 100. In some examples, the vehicle speed measured by the vehicle speed sensor 106 is presented to the driver via a speedometer, utilized by the autonomy unit 104 for controlling performance of autonomous and/or semi-autonomous motive functions, and/or is utilized to control performance of other functions of the vehicle (e.g., activate the rearview camera 108 to monitor a trailing vehicle 206 of FIGS. 2B-2C). Further, the rearview camera 108 collects image(s) and/or video of an area behind and/or adjacent to the vehicle 100. In the illustrated example, the rearview camera 108 is located along an exterior surface of the vehicle 100. In other examples, the rearview camera 108 may be positioned within a cabin and/or at any other location of the vehicle 100.

The vehicle 100 of the illustrated example also includes a display 110 and speakers 112. For example, the display 110 presents visual information to the driver and/or other occupant(s) of the vehicle 100. In some examples, the display 110 presents the speed of the vehicle 100, image(s) and/or video captured by the rearview camera 108, media, warnings, and/or any other information to the occupant(s) of the vehicle 100. Further, the speakers 112 of the illustrated example present audio information to the occupant(s) of the vehicle 100, such as the speed of the vehicle 100, media, warnings, etc.

As illustrated in FIG. 1, the vehicle 100 also includes a lane controller 114. The lane controller 114 identifies when another vehicle behind the vehicle 100 (e.g., the trailing vehicle 206 of FIG. 2) is conveying a message for the vehicle 100 to change lanes and sends a lane-changing signal (e.g., to the driver, to the autonomy unit 104) to change lanes upon identifying the message.

In operation, the rearview camera 108 captures image(s) and/or video for detecting and/or monitoring a trailing vehicle behind the vehicle 100. In some examples, the rearview camera 108 captures image(s) and/or video for detecting and/or monitoring the trailing vehicle when the vehicle 100 is traveling at a speed above a predetermined threshold (e.g., about 50 miles per hour or 80 kilometers per hour). For example, the predetermined threshold corresponds to a lowest typical speed limit of a highway of a region. In the illustrated example, the vehicle speed sensor 106 measures the speed of the vehicle 100.

The lane controller 114 of the vehicle 100 detects whether there is a trailing vehicle behind the vehicle 100 based upon the image(s) and/or video captured by the rearview camera 108. Responsive to determining that there is a trailing vehicle behind the vehicle 100, the lane controller 114 determines whether the trailing vehicle is providing a message for the vehicle 100 to change lanes from a passing lane (e.g., a passing lane 204 of FIGS. 2A-2C) to an adjacent lane (e.g., a non-passing lane). For example, the trailing vehicle conveys the message to the vehicle 100 to change lanes into the adjacent lane so that the trailing vehicle may pass the vehicle 100 via the passing lane.

In some examples, to determine whether the trailing vehicle is conveying the message to the vehicle 100, the lane controller analyzes images (e.g., an image 300 of FIG. 3) captured by the rearview camera 108 by (i) creating grayscale images based on the images captured by the rearview camera 108, (ii) setting data of the grayscale images to a threshold, (iii) counting a number of white pixels of the grayscale images, (iv) determining frame light intensities, for each of the grayscale images, based on the number of white pixels in each of the grayscale images, and (v) determining whether the trailing vehicle is conveying a message to the vehicle 100 based on the frame light intensities of the grayscale images.

Further, the lane controller 114 of the illustrated example determines the trailing vehicle is providing the message for the vehicle 100 to change lanes upon identifying, via the images, that the trailing vehicle is within a predetermined distance (e.g., a predetermined distance 210 of FIG. 2C) of the vehicle 100, the trailing vehicle is flashing its high beams at the vehicle 100, and/or a turn signal of the trailing vehicle corresponding to a direction opposition an adjacent lane (e.g., a turn-signal lamp 308a of FIG. 3) is activated.

To identify that the trailing vehicle is within a predetermined distance of the vehicle 100, the lane controller 114 detects a distance (e.g., a distance 212 of FIG. 2C) between the trailing vehicle and the vehicle 100, identifies the predetermined distance based upon the speed of the vehicle, and compares the predetermined distance to the distance between the trailing vehicle and the vehicle 100. If the distance between the trailing vehicle and the vehicle 100 is less than the predetermined distance, the lane controller 114 determines that the trailing vehicle is conveying a message to the vehicle 100.

To identify that the trailing vehicle is flashing its high beams at the vehicle 100, the lane controller 114 compares an intensity of the headlights of the trailing vehicle over a period of time based upon the images captured by the rearview camera 108. For example, the lane controller 114 identifies that the trailing vehicle is cycling its high beams upon identifying a series of local maximums (e.g., peaks) and local minimums (e.g., valleys) that correspond to a sequence of activating high beams lamps (e.g., high-beam lamps 306 of FIG. 3) and low beam lamps (e.g., low-beam lamps 304 of FIG. 3), respectively, of the trailing vehicle.

To identify activation of a turn signal of the trailing vehicle, the lane controller 114 compares an intensity of one of the headlights of the trailing vehicle to an intensity of the other of the headlights of the trailing vehicle. For example, the lane controller 114 compares an intensity of the left headlight to an intensity of the left headlight over time based upon the images captured by the rearview camera 108 to determine whether a turn signal of the trailing vehicle that corresponds to a direction opposite to an adjacent lane is activated. That is, if the adjacent lane is to the right, the lane controller 114 determines that the trailing vehicle is conveying the message to the vehicle 100 if the left turn signal of the trailing vehicle is activated. Similarly, if the adjacent lane is to the left, the lane controller 114 determines that the trailing vehicle is conveying the message to the vehicle 100 if the right turn signal of the trailing vehicle is activated. In some examples, the lane controller 114 identifies the direction to the adjacent lane relative to the position of the vehicle 100 based upon the image(s) and/or video captured by the rearview camera 108. In some examples, prior to determining that the trailing vehicle is providing the message for the vehicle 100 to change lanes, the lane controller 114 confirms that the trailing vehicle has not activate its turn signal to indicate that the trailing vehicle is turning. For example, the lane controller 114 identifies, via GPS and/or camera(s) of the vehicle 100, whether there an intersection, an exit ramp, etc. onto which the trailing vehicle is to turn. When the lane controller 114 identifies that the trailing vehicle is turning, the lane controller 114 determines that the trailing vehicle is not providing a message to the vehicle 100.

Further, in the illustrated example, the lane controller 114 sends a lane-changing signal in response to determining that the trailing vehicle is sending a message to the vehicle 100 to change lanes from the passing lane. In examples in which the driver is controlling the motive functions of the vehicle 100 (e.g., the vehicle 100 is non-autonomous or semi-autonomous), the signal includes an alert to change lanes that is presented to the driver of the vehicle 100. The alert includes a visual alert that is presented via the display 110, an audio alert that is emitted via the speakers 112, and/or a haptic alert that is provided via a haptic device (e.g., a haptic device 606 of FIG. 6) located within the steering wheel 102 and/or a driver's seat of the vehicle 100. The display 110, the speakers 112, and/or the haptic device provides the alert to inform the driver that the trailing vehicle would like he or she to change lanes to an adjacent lane. For example, the driver of the vehicle 100 may be unaware of the meaning of the message conveyed by the trailing vehicle and/or may not notice the message conveyed behind the vehicle 100 if he or she is focused on the portion of the road ahead of the vehicle 100. Further, in examples in which motive functions of the vehicle are being performed autonomously (e.g., the vehicle 100 is autonomous or semi-autonomous), the lane-changing signal includes an instruction for the autonomy unit 104 to perform an autonomous motive function to autonomously change lanes.

Figure 2A:
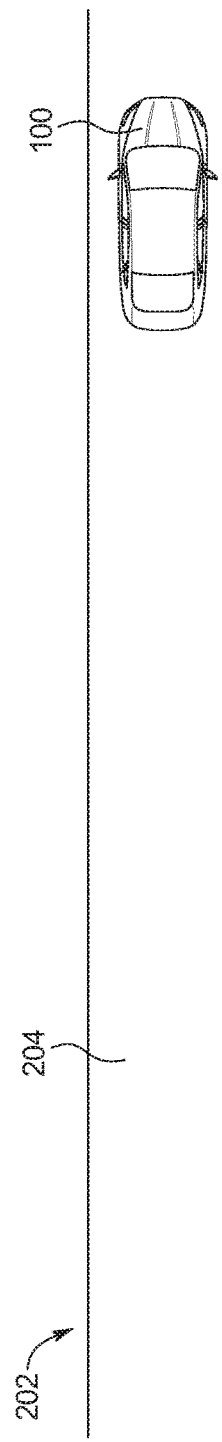
FIG. 2A illustrates the vehicle of FIG. 1 traveling along a road.
Figure 2B:
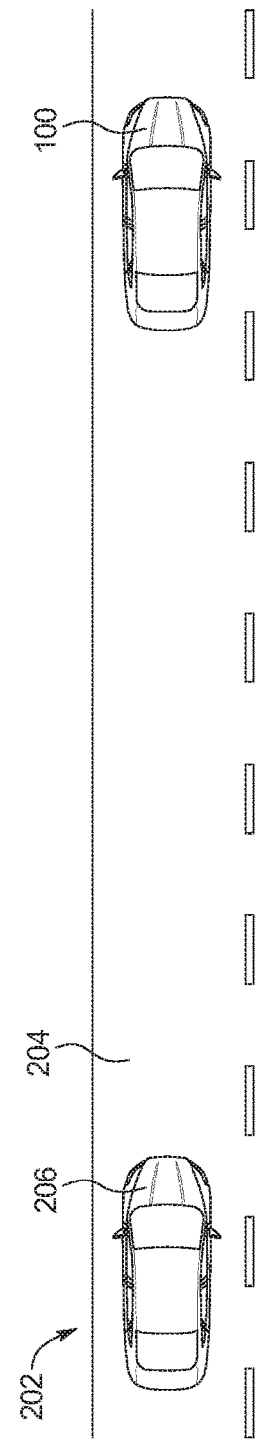
FIG. 2B illustrates the vehicle of FIG. 2A being approached by another vehicle.
Figure 2C:
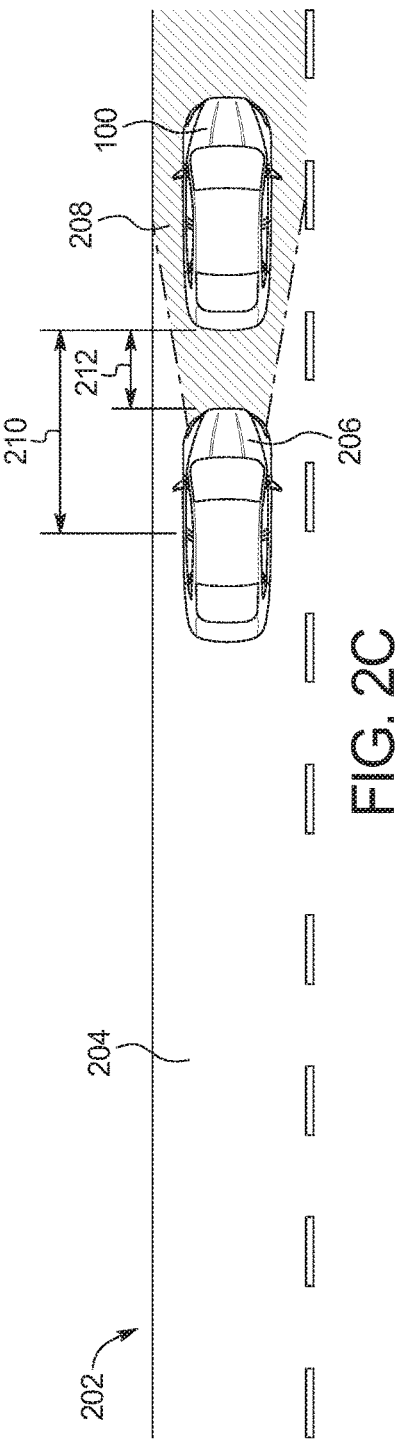
FIG. 2C illustrates the vehicle of FIG. 2A being trailed by the other vehicle of FIG. 2B.

FIGS. 2A-2C illustrate the vehicle 100 traveling along a road 202. More specifically, FIG. 2A depicts the vehicle 100 alone in a passing lane 204 of the road 202. In the illustrated example, the road 202 is a multilane road (e.g., a road that includes multiple lanes for each direction of travel). For example, the road 202 is a four-lane road that includes two lanes designated for travel in a first direction and two lanes designated for travel in an opposing second direction.

FIG. 2B depicts a trailing vehicle 206 that is approaching the vehicle 100 within the passing lane 204 of the road 202. In FIG. 2B, the trailing vehicle 206 is yet to provide a message to the vehicle 100 to change lanes from the passing lane 204 to an adjacent lane to the right.

FIG. 2C depicts the trailing vehicle 206 trailing the vehicle 100. As illustrated in FIG. 2C, the trailing vehicle 206 emits headlights 208 as the trailing vehicle 206 trails the vehicle 100 within the passing lane 204 of the road 202. In some examples, the headlights 208 convey the message for the vehicle 100 to change from the passing lane 204 to the adjacent lane. For example, the headlights 208 convey the message if high beams of the trailing vehicle 206 are being flashed and/or if a left turn signal of the trailing vehicle 206 is activated.

In the illustrated example, the trailing vehicle 206 is conveying the message for the vehicle 100 to change lanes by trailing the vehicle 100 within a predetermined distance 210. That is, because a distance 212 between the trailing vehicle 206 and the vehicle 100 is less than the predetermined distance 210, the lane controller 114 determines that the trailing vehicle 206 is conveying the message to the vehicle 100 to change lanes. The predetermined distance 210 of the illustrated example corresponds to a safe trailing distance for the speed at which the vehicle 100 and/or the trailing vehicle 206 are traveling. For example, the predetermined distance is greater when the vehicle 100 is traveling at greater speed (e.g., about 75 miles per hour or 120 kilometers per hour) compared to when the vehicle 100 is traveling at slower speed (e.g., about 50 miles per hour or 80 kilometers per hour).

Further, the lane controller 114 of the illustrated example determines the distance 212 between the vehicle 100 and the trailing vehicle 206 based upon a size (e.g., a diameter) of the headlights 208 of the trailing vehicle 206 within images (e.g., an image 300 of FIG. 3) captured by the rearview camera 108. Additionally or alternatively, the lane controller 114 determines the distance 212 utilizing a proximity sensor (e.g., a radar sensor 618 of FIG. 6, a lidar sensor 620 of FIG. 6, an ultrasonic sensor 622 of FIG. 6) of the vehicle 100.

Figure 3:
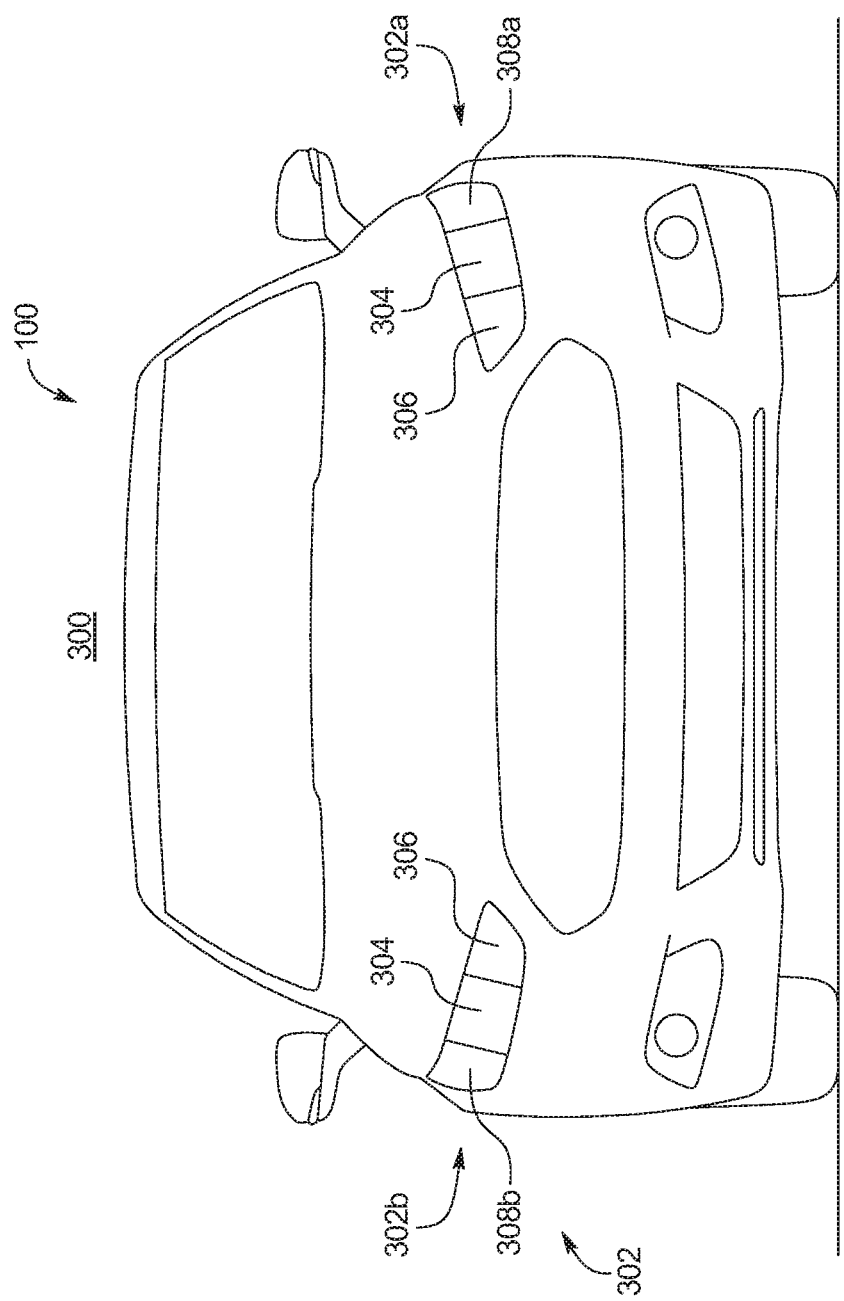
FIG. 3 depicts an image of a trailing vehicle as captured by a rearview camera of the vehicle of FIG. 1.

FIG. 3 depicts an image 300 of the trailing vehicle 206 that is captured via the rearview camera 108 of the vehicle 100. As illustrated in FIG. 3, the trailing vehicle 206 includes headlamps 302. For example, the headlamps include 300 include a headlamp 302a (e.g., a first headlamp, a left headlamp, a driver-side headlamp) and a headlamp 302b (e.g., a first headlamp, a left headlamp, a driver-side headlamp).

As illustrated in FIG. 3, the headlamps 302 include low-beam lamps 304, high-beam lamps 306, and turn signal lamps 308. More specifically, the headlamp 302a includes one of the low-beam lamps 304, one of the high-beam lamps 306, and a turn-signal lamp 308a (e.g., a left turn signal lamp). The the headlamp 302b includes another of the low-beam lamps 304, another of the high-beam lamps 306, and a turn-signal lamp 308b (e.g., a right turn signal lamp). The low-beam lamps 304 emit low beams when activated, the high-beam lamps 306 emit high beams when activated, the turn-signal lamp 308a emits a left turn signal when activated, and the turn-signal lamp 308b emits a right turn signal when activated.

Figure 4:
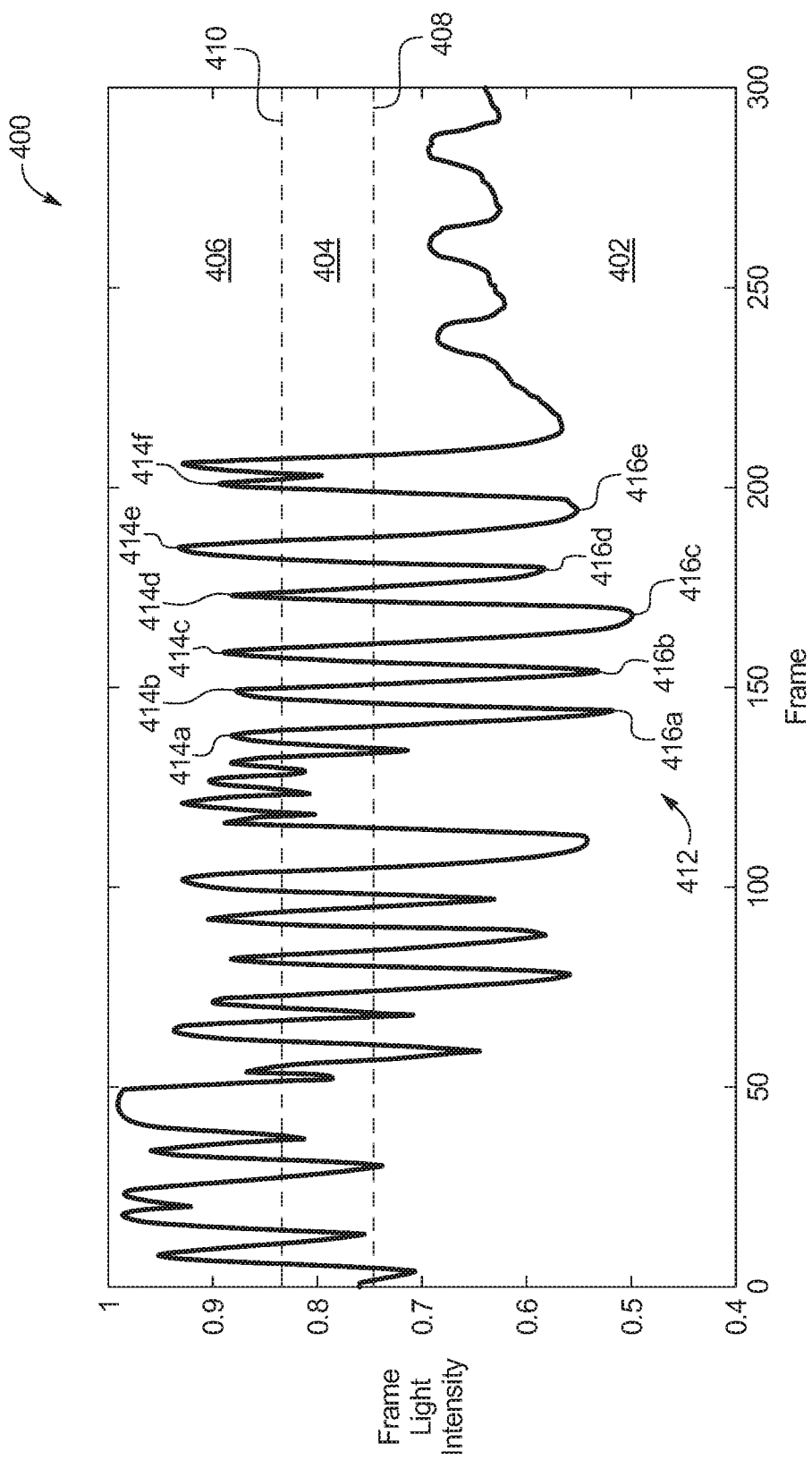
FIG. 4 depicts a graph that indicates a trailing vehicle is flashing its high beams to send a message to the vehicle of FIG. 1.

FIG. 4 depicts a graph 400 that indicates whether the trailing vehicle 206 is flashing its high beams to send a message to the vehicle 100. The x-axis represents frames of the images captured by the rearview camera 108, and the y-axis represents an intensity of the headlights 208. In the illustrated example, the light intensity values are normalized to be between a value of '0' and a value of '1.' The graph 400 of the illustrated example includes a low-intensity portion 402, a middle-intensity portion 404, and a high-intensity portion 406. The low-intensity portion 402 corresponds to low-beam headlights and is defined by a low-beam threshold 408. That is, a light intensity that is less than the low-beam threshold 408 corresponds to the low-beam lamps 304 of the trailing vehicle 206 being activated. Further, the high-intensity portion 406 corresponds to high-beam headlights and is defined by a high-beam threshold 410. That is, a light intensity that is greater than the high-beam threshold 410 corresponds to the high-beam lamps 306 of the trailing vehicle 206 being activated.

The lane controller 114 determines that the trailing vehicle 206 is flashing its high beams upon identifying a series of local minimums (e.g., valleys) within the low-intensity portion 402 and local maximums (e.g., peaks) within the high-intensity portion 406. For example, the graph 400 includes a sequence of frames 412 that includes a local maximum 414a within the high-intensity portion 406, a subsequent local minimum 416a within the low-intensity portion 402, a subsequent local maximum 414b within the high-intensity portion 406, a subsequent local minimum 416b within the low-intensity portion 402, a subsequent local maximum 414c within the high-intensity portion 406, a subsequent local minimum 416c within the low-intensity portion 402, a subsequent local maximum 414d within the high-intensity portion 406, a subsequent local minimum 416d within the low-intensity portion 402, a subsequent local maximum 414e within the high-intensity portion 406, a subsequent local minimum 416e within the low-intensity portion 402, and a subsequent local maximum 414f within the high-intensity portion 406. That is, based upon the sequence of frames 412 of the graph 400, the lane controller 114 determines that the trailing vehicle 206 is flashing its high beams at the vehicle 100.

Figure 5:
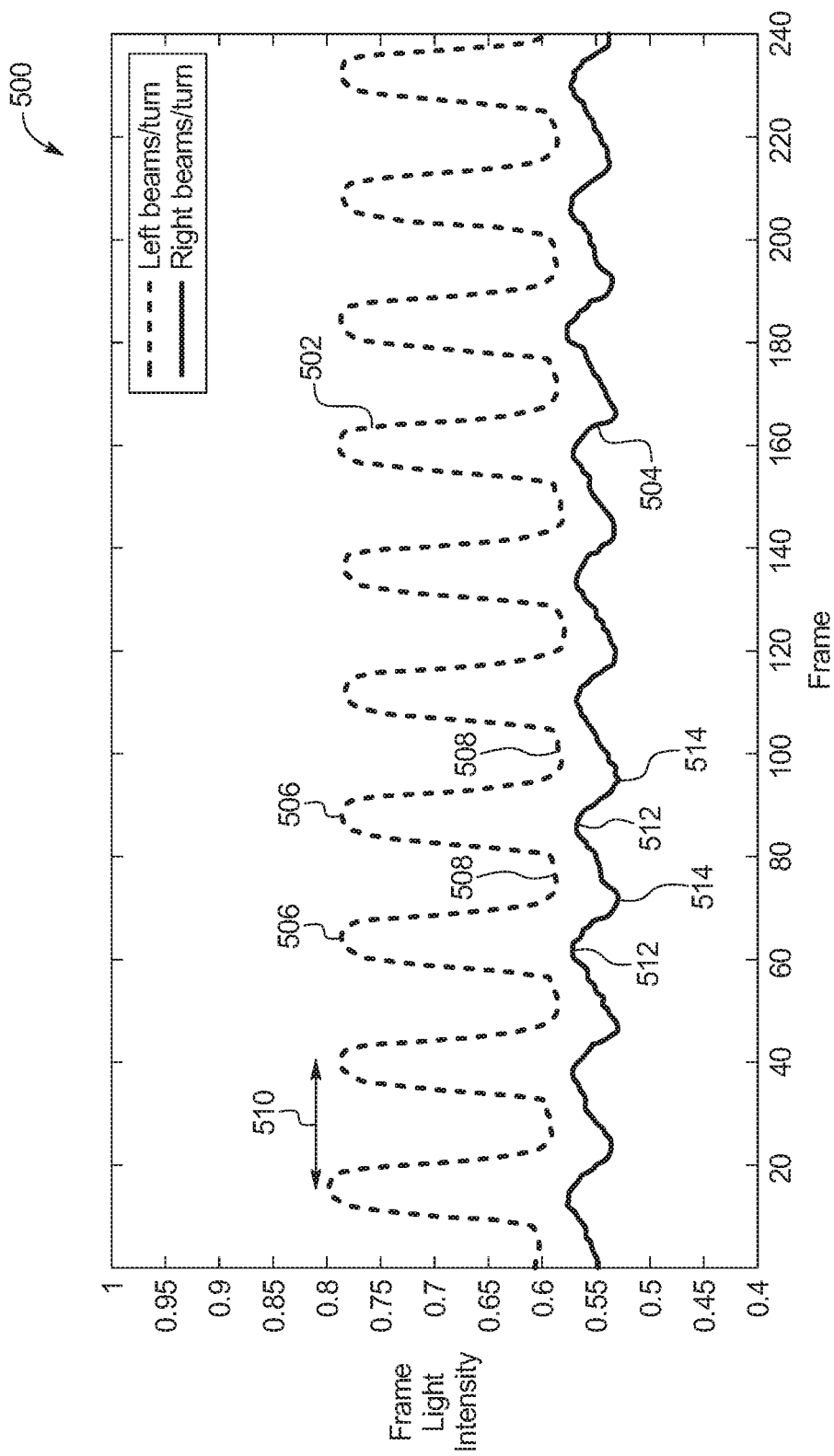
FIG. 5 depicts a graph that indicates a trailing vehicle has its turn signal to send a message to the vehicle of FIG. 1.

FIG. 5 depicts a graph 500 that indicates the turn-signal lamp 308a of the trailing vehicle 206 is activated to send a message to the vehicle 100. The x-axis represents frames of the images captured by the rearview camera 108, and the y-axis represents an intensity of the headlights 208. In the illustrated example, the light intensity values are normalized to be between a value of '0' and a value of '1.' The graph 500 of the illustrated example includes a plot line 502 (e.g., a first plot line) that corresponds to a light intensity emitted by the headlamp 302a (e.g., the left headlamp) and a plot line 504 (e.g., a second plot line) that corresponds to a light intensity emitted by the headlamp 302b (e.g., the right headlamp). As illustrated in FIG. 5, the plot line 502 corresponding to the headlamp 302a include local maximums 506 and local minimums 508 that oscillate at a frequency 510. Further, the plot line 504 corresponding to the headlamp 302b include local maximums 512 and local minimums 514 that oscillate at the frequency 510. The frequency 510 indicates that the turn-signal lamp 308a and/or the turn-signal lamp 308b is activated over a period of time. The local maximums 506 and the local minimums 508 of the plot line 502 correspond to activation of the turn-signal lamp 308a during which the turn-signal lamp 308a turns on and off cyclically. Additionally, the local maximums 512 and the local minimums 514 of the plot line 504 correspond to the turn-signal lamp 308b being deactivated while the turn-signal lamp 308a is activated.

The lane controller 114 of the vehicle 100 determines that the trailing vehicle 206 has activated the turn-signal lamp 308a upon identifying the frequency 510, the local maximums 506 and the local minimums 508 corresponding to the turn-signal lamp 308a, and/or the local maximums 512 and the local minimums 514 corresponding to the turn-signal lamp 308b. That is, based upon the sequence of frames of the graph 500, the lane controller 114 determines that the trailing vehicle 206 has activated its turn signal while trailing the vehicle 100.

Figure 6:
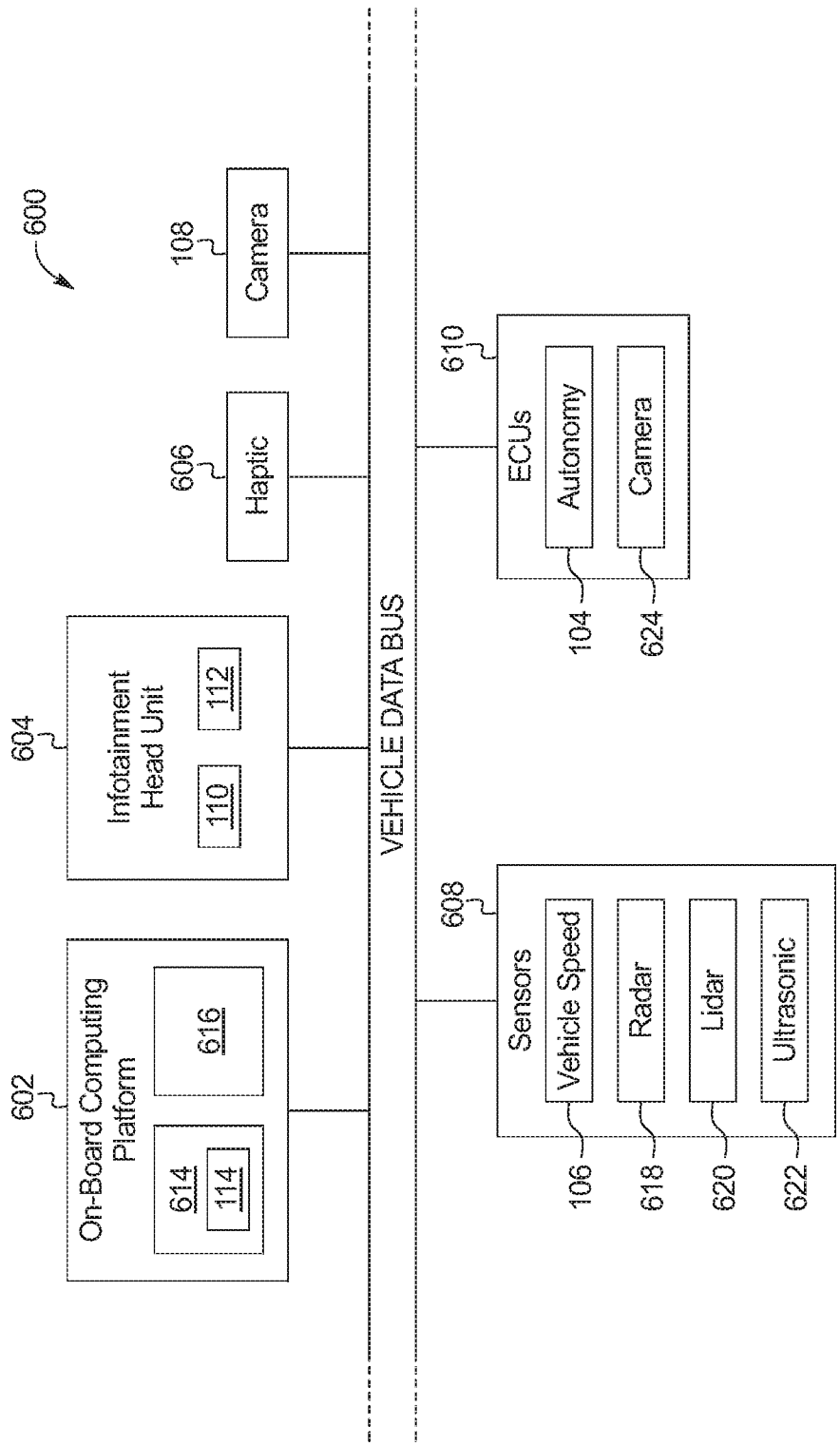
FIG. 6 is a block diagram of electronic components of the vehicle of FIG. 1.

FIG. 6 is a block diagram of electronic components 600 of the vehicle 100. As illustrated in FIG. 6, the electronic components 600 include an on-board computing platform 602, an infotainment head unit 604, a haptic device 606, the rearview camera 108, sensors 608, electronic control units (ECUs) 610, and a vehicle data bus 612.

The on-board computing platform 602 includes a microcontroller unit, controller or processor 614 and memory 616. In some examples, the processor 614 of the on-board computing platform 602 is structured to include the lane controller 114. Alternatively, in some examples, the lane controller 114 is incorporated into another electronic control unit (ECU) with its own processor 614 and memory 616. The processor 614 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 616 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 616 includes multiple kinds of memory, particularly volatile memory and non-volatile memory.

The memory 616 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 616, the computer readable medium, and/or within the processor 614 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 604 provides an interface between the vehicle 100 and a user. The infotainment head unit 604 includes digital and/or analog interfaces (e.g., input devices and output devices) to receive input from and display information for the user(s). The input devices include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, the display 110 (e.g., a heads-up display, a center console display such as a liquid crystal display (LCD), an organic light emitting diode (OLED) display, a flat panel display, a solid state display, etc.), and/or the speakers 112. In the illustrated example, the infotainment head unit 604 includes hardware (e.g., a processor or controller, memory, storage, etc.) and software (e.g., an operating system, etc.) for an infotainment system (such as SYNC® and MyFord Touch® by Ford®, etc.). Additionally, the infotainment head unit 604 displays the infotainment system on, for example, the display 110.

The haptic device 606 provides a haptic alert to the driver of the vehicle 100 when the trailing vehicle 206 is providing a message to the vehicle 100 to change lanes. For example, the haptic device 606 is located in the steering wheel 102 of the vehicle 100 to enable a driver to feel the haptic alert when driving the vehicle 100. In some examples, the haptic device 606 includes a plurality of vibrating components or elements that are located throughout the vehicle 100 to facilitate the haptic device 606 in providing an alert that is felt by the driver.

The sensors 608 are arranged in and around the vehicle 100 to monitor properties of the vehicle 100 and/or an environment in which the vehicle 100 is located. One or more of the sensors 608 may be mounted to measure properties around an exterior of the vehicle 100. Additionally or alternatively, one or more of the sensors 608 may be mounted inside a cabin of the vehicle 100 or in a body of the vehicle 100 (e.g., an engine compartment, wheel wells, etc.) to measure properties in an interior of the vehicle 100. For example, the sensors 608 include accelerometers, odometers, tachometers, pitch and yaw sensors, wheel speed sensors, microphones, tire pressure sensors, biometric sensors and/or sensors of any other suitable type.

In the illustrated example, the sensors 608 include the vehicle speed sensor 106, a radar sensor 618, a lidar sensor 620, and an ultrasonic sensor 622. For example, the vehicle speed sensor 106 detects a speed at which the vehicle 100 is traveling. The radar sensor 618 detects and locates object(s) (e.g., other vehicles, guard rails, pedestrians, animals, etc.) near the vehicle 100 via radio waves, the lidar sensor 620 detects and locates object(s) near the vehicle 100 via lasers, and the ultrasonic sensor 622 detects and locates object(s) near the vehicle 100 via ultrasound waves.

The ECUs 610 monitor and control the subsystems of the vehicle 100. For example, the ECUs 610 are discrete sets of electronics that include their own circuit(s) (e.g., integrated circuits, microprocessors, memory, storage, etc.) and firmware, sensors, actuators, and/or mounting hardware. The ECUs 610 communicate and exchange information via a vehicle data bus (e.g., the vehicle data bus 612). Additionally, the ECUs 610 may communicate properties (e.g., status of the ECUs 610, sensor readings, control state, error and diagnostic codes, etc.) to and/or receive requests from each other. For example, the vehicle 100 may have seventy or more of the ECUs 610 that are positioned in various locations around the vehicle 100 and are communicatively coupled by the vehicle data bus 612.

In the illustrated example, the ECUs 610 include the autonomy unit 104 and a camera module 624. The autonomy unit 104 controls performance of autonomous and/or semi-autonomous driving maneuvers of the vehicle 100 based upon, at least in part, image(s) and/or video captured by the rearview camera 108 and/or or data collected by the vehicle speed sensor 106, the radar sensor 618, the lidar sensor 620, and/or the ultrasonic sensor 622. The camera module 624 controls one or more cameras of the vehicle 100 (e.g., the rearview camera 108) to collect image(s) and/or video that are presented to occupant(s) of the vehicle 100 (e.g., via the display 110) and/or are utilized to facilitate the autonomy unit 104 in performing autonomous and/or semi-autonomous driving maneuvers.

The vehicle data bus 612 communicatively couples the rearview camera 108, the on-board computing platform 602, the infotainment head unit 604, the haptic device 606, the sensors 608, and the ECUs 610. In some examples, the vehicle data bus 612 includes one or more data buses. The vehicle data bus 612 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 7:
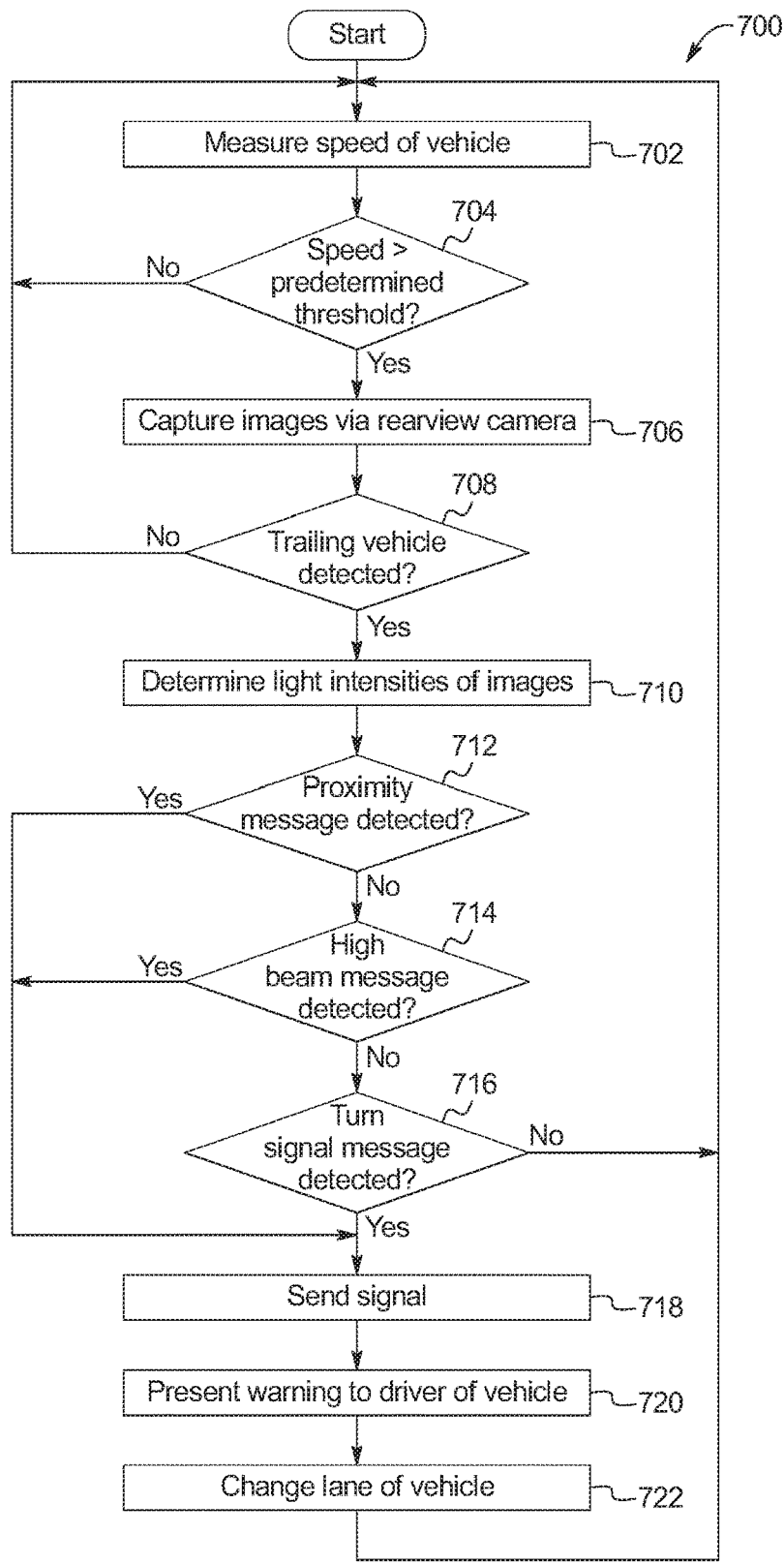
FIG. 7 is a flowchart for identifying when a trailing vehicle is sending a message for the vehicle of FIG. 1 to change lanes in accordance with the teachings herein.

FIG. 7 is a flowchart of an example method 700 to identify when a trailing vehicle is sending a message to a lead vehicle to change lanes in accordance with the teachings herein. The flowchart of FIG. 7 is representative of machine readable instructions that are stored in memory (such as the memory 616 of FIG. 6) and include one or more programs which, when executed by a processor (such as the processor 614 of FIG. 6), cause the vehicle 100 to implement the example lane controller 114 of FIGS. 1 and 6. While the example program is described with reference to the flowchart illustrated in FIG. 7, many other methods of implementing the example lane controller 114 may alternatively be used. For example, the order of execution of the blocks may be rearranged, changed, eliminated, and/or combined to perform the method 700. Further, because the method 700 is disclosed in connection with the components of FIGS. 1-6, some functions of those components will not be described in detail below.

Initially, at block 702, the vehicle speed sensor 106 measures a speed at which the vehicle 100 is traveling. At block 704, the lane controller 114 determines whether the speed of the vehicle 100 is greater than a predetermined speed threshold (e.g., about 50 miles per hour or 80 kilometers per hour). In response to the lane controller 114 determining that the speed of the vehicle 100 is not greater than the vehicle speed threshold, the method 700 returns to block 702. Otherwise, in response to the lane controller 114 determining that the speed of the vehicle 100 is greater than the vehicle speed threshold, the method 700 proceeds to block 704.

At block 706, the rearview camera 108 of the vehicle 100 captures image(s) and/or video of an area behind the vehicle 100. At block 708, the lane controller 114 detects whether the trailing vehicle 206 is trailing the vehicle 100. For example, the lane controller 114 detects the trailing vehicle 206 based upon the image(s) and/or video captured by the rearview camera 108. In response to the lane controller 114 detecting that the trailing vehicle 206 is not present, the method 700 returns to block 702. Otherwise, in response to the lane controller 114 detecting that the trailing vehicle 206 is present behind the vehicle 100, the method 700 proceeds to 710.

At block 710, the lane controller 114 determines the light intensities of the headlights 208 of the trailing vehicle 206 within the images (e.g., the image 300 of FIG. 3) captured by the rearview camera 108. For example, the lane controller 114 determines the light intensities of the headlights 208 within the images to enable the lane controller 114 to determine whether the trailing vehicle 206 is providing a message to the vehicle 100 to change lanes from the passing lane 204. In some examples, the lane controller 114 determines the light intensities of the headlights 208 within each of the images by (i) creating grayscale images based on the images captured by the rearview camera 108, (ii) setting data of the grayscale images to a threshold, (iii) counting a number of white pixels of the grayscale images, and (iv) determining frame light intensities, for each of the grayscale images, based on the number of white pixels in each of the grayscale images.

At block 712, the lane controller 114 detects whether the trailing vehicle 206 is providing a proximity message. The proximity message indicates that the trailing vehicle 206 is instructing the vehicle 100 to change lanes from the passing lane 204. The proximity message is conveyed by the trailing vehicle 206 by trailing the vehicle 100 within the predetermined distance 210. The lane controller 114 identifies the proximity message, for example, based upon the images captured by the rearview camera 108 of the vehicle 100. In response to the lane controller 114 determining that the trailing vehicle 206 is not providing the proximity message, the method proceeds to block 714.

At block 714, the lane controller 114 detects whether the trailing vehicle 206 is providing a high-beam message. The high-beam message indicates that the trailing vehicle 206 is instructing the vehicle 100 to change lanes from the passing lane 204. The high-beam message is conveyed by the trailing vehicle 206 by flashing its high beams toward the vehicle 100. The lane controller 114 identifies the high-beam message, for example, based upon the images captured by the rearview camera 108 of the vehicle 100. In response to the lane controller 114 determining that the trailing vehicle 206 is not providing the high-beam message, the method proceeds to block 716.

At block 716, the lane controller 114 detects whether the trailing vehicle 206 is providing a turn-signal message to the vehicle 100. The turn-signal message indicates that the trailing vehicle 206 is instructing the vehicle 100 to change lanes from the passing lane 204. The turn-signal message is conveyed by the trailing vehicle 206 activating its turn signal that corresponds to a direction opposite to an adjacent lane of the road 202. The lane controller 114 identifies the turn-signal message, for example, based upon the images captured by the rearview camera 108 of the vehicle 100. In response to the lane controller 114 determining that the trailing vehicle 206 is not providing the turn-signal message, the method returns to block 702.

Otherwise in response to detecting a message at block 712, block 714, and/or block 716, the lane controller 114 sends a lane-changing signal (block 718). For example, if the driver controls motive functions of the vehicle (e.g., vehicle 100 is non-autonomous or semi-autonomous), the lane controller 114 sends the lane-changing signal to present an alert to the driver of the vehicle 100 to instruct the driver to change lanes from the passing lane 204 to an adjacent lane. If the vehicle 100 performs autonomous motive functions (e.g., the vehicle 100 is autonomous or semi-autonomous), the lane-changing signal includes an instruction to the autonomy unit 104 to autonomously change lanes of the vehicle 100 to the adjacent lane.

At block 720, the display 110, the speakers 112, the haptic device 606, and/or other output device(s) of the vehicle 100 provide an alert and/or warning to the driver that indicates the trailing vehicle 206 would like the driver to change lanes from the passing lane 204 and into the adjacent lane. For example, the output device(s) provide the alert upon receiving the lane-changing signal from the lane controller 114. At block 722, the autonomy unit 104 causes the vehicle 100 to autonomously change lanes from the passing lane 204 and into the adjacent lane upon receiving the lane-changing signal from the lane controller 114. For example, upon receiving the lane-changing signal, the autonomy unit checks to see if the adjacent lane is clear and, if the adjacent lane is clear, causes the vehicle to change lanes from the passing lane 204 and into the adjacent lane.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively. Additionally, as used herein, the terms "module" and "unit" refer to hardware with circuitry to provide communication, control and/or monitoring capabilities, often in conjunction with sensors. A "module" and an "unit" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a vehicle speed sensor to measure a vehicle speed;
   a rearview camera to capture images when the vehicle speed is greater than a threshold; and
   a lane controller to:
      detect whether there is a trailing vehicle based on the images;
      determine, responsive to detecting the trailing vehicle, whether the trailing vehicle is providing a message to change lanes, wherein, to determine whether the trailing vehicle is providing the message, the lane controller is to:
         identify whether the trailing vehicle is within a predetermined distance corresponding to the vehicle speed;
         identify whether the trailing vehicle is flashing its high beams;
         identify whether a turn signal of the trailing vehicle that corresponds to a direction opposite to an adjacent lane is activated; and
         determine that the trailing vehicle is providing the message responsive to determining that at least one the trailing vehicle is within the predetermined distance, the trailing vehicle is flashing its high beams, and the turn signal is activated; and
      send a lane-changing signal responsive to identifying the message.

2. The vehicle of claim 1, wherein the lane-changing signal is an alert to a driver to change lanes.

3. The vehicle of claim 2, further including a display, speakers, and a steering wheel, wherein the alert is at least one of a visual alert presented via the display, an audio alert emitted via the speakers, and a haptic alert provided via the steering wheel.

4. The vehicle of claim 1, further including an autonomy unit to perform an autonomous motive function, wherein the lane-changing signal is an instruction for the autonomy unit to autonomously change lanes.

5. The vehicle of claim 1, wherein, to determine whether the trailing vehicle is providing the message, the lane controller is to:
   create grayscale images based on the images captured by the rearview camera;
   set data of the grayscale images to a threshold;
   count a number of white pixels of the grayscale images;
   determine frame light intensities based on the number of white pixels for each of the grayscale images; and
   determine whether the trailing vehicle is providing the message based on the frame light intensities of the grayscale images.

6. The vehicle of claim 1, wherein, to identify whether the trailing vehicle is within the predetermined distance, the lane controller is to:
   detect a distance to the trailing vehicle based on a size of headlights of the trailing vehicle within the images;
   identify the predetermined distance that corresponds to a safe trailing distance based on the vehicle speed; and
   compare the distance to the predetermined distance.

7. The vehicle of claim 1, wherein, to identify the trailing vehicle is flashing its high beams, the lane controller compares an intensity of headlights of the trailing vehicle over time based on the images captured by the rearview camera.

8. The vehicle of claim 1, wherein, to identify whether the trailing vehicle has activated the turn signal, the lane controller compares an intensity of a left headlight of the trailing vehicle to an intensity of a right headlight of the trailing vehicle over time based on the images captured by the rearview camera.

9. The vehicle of claim 1, wherein the lane controller identifies the direction to the adjacent lane based on the images captured by the rearview camera.

10. A method for changing lanes based on trailing vehicles, comprising:
    capturing images via a rearview camera of a vehicle;
    detecting, via a processor, whether there is a trailing vehicle based on the images;
    determining, responsive to detecting the trailing vehicle, whether the trailing vehicle is providing a message to change lanes, wherein determining whether the trailing vehicle is providing the message includes determining whether the trailing vehicle is within a predetermined distance of the vehicle, the predetermined distance corresponding to a speed of the vehicle; and
    sending a lane-changing signal responsive to identifying the message.

11. The method of claim 10, further including:
    measuring a speed of the vehicle a vehicle speed sensor; and
    capturing the images via the rearview camera responsive to determining that the speed is greater than a threshold.

12. The method of claim 10, wherein sending the lane-changing signal includes presenting at least one of a visual alert, an audio alert, and a haptic alert to a driver.

13. The method of claim 10, wherein sending the lane-changing signal includes transmitting an instruction for an autonomy unit of the vehicle to autonomously change lanes for the vehicle.

14. The method of claim 10, wherein determining whether the trailing vehicle is providing the message includes determining whether the trailing vehicle is flashing its high beams.

15. The method of claim 10, wherein determining whether the trailing vehicle is providing the message includes determining whether a turn signal of the trailing vehicle that corresponds to a direction opposite to an adjacent lane is activated.

16. A vehicle comprising:
- a vehicle speed sensor configured to measure a vehicle speed;
- a rearview camera configured to capture images when the vehicle speed is greater than a threshold; and
- a lane controller configured to:
  - detect whether there is a trailing vehicle based on the images;
  - determine, responsive to detecting the trailing vehicle, whether the trailing vehicle is providing a message to change lanes, wherein the lane controller is configured to determine that the trailing vehicle is providing the message to change lanes responsive to determining that the trailing vehicle is within a predetermined distance of the vehicle, wherein the predetermined distance corresponds with a speed of the vehicle; and
  - send a lane-changing signal responsive to identifying the message.

17. The vehicle of claim 16, wherein the lane controller is configured to determine that the trailing vehicle is providing the message responsive to determining that the trailing vehicle is flashing its high beams.

18. The vehicle of claim 16, wherein the lane controller is configured to determine that the trailing vehicle is providing the message responsive to determining a turn signal of the trailing vehicle that corresponds to a direction opposite to an adjacent lane is activated.

* * * * *